US012320888B2

(12) United States Patent
Jakubzak et al.

(10) Patent No.: US 12,320,888 B2
(45) Date of Patent: Jun. 3, 2025

(54) CONTROLLING COMPUTER-GENERATED FACIAL EXPRESSIONS

(71) Applicant: Microsoft Technology Licensing, LLC, Redmond, WA (US)

(72) Inventors: Kenneth Mitchell Jakubzak, Lynnwood, WA (US); Mathew J. Lamb, Seattle, WA (US); Jouya Jadidian, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 420 days.

(21) Appl. No.: 17/663,111

(22) Filed: May 12, 2022

(65) Prior Publication Data

US 2023/0367002 A1 Nov. 16, 2023

(51) Int. Cl.
*G01S 13/66* (2006.01)
*G01S 7/41* (2006.01)
*G01S 13/06* (2006.01)
*G01S 13/89* (2006.01)

(52) U.S. Cl.
CPC ............. *G01S 13/66* (2013.01); *G01S 7/415* (2013.01); *G01S 13/06* (2013.01); *G01S 13/89* (2013.01)

(58) Field of Classification Search
None
See application file for complete search history.

(56) References Cited

U.S. PATENT DOCUMENTS

| 5,012,206 A | 4/1991 | Tigges |
| 9,672,416 B2 | 6/2017 | Zhang et al. |
| 10,089,522 B2 | 10/2018 | Yu et al. |
| 10,419,655 B2 | 9/2019 | Sivan |
| 10,529,113 B1 | 1/2020 | Sheikh |
| 10,684,467 B2 | 6/2020 | Gibbs |
| 10,789,753 B2 | 9/2020 | Miller et al. |
| 11,020,654 B2 | 6/2021 | Sun |
| 11,042,729 B2 | 6/2021 | Sud et al. |
| 11,614,345 B2 | 3/2023 | Jadidian |

(Continued)

FOREIGN PATENT DOCUMENTS

| CN | 107430437 A | 12/2017 |
| EP | 0998659 A1 | 5/2000 |
| JP | 2017220032 A | 12/2017 |

OTHER PUBLICATIONS

"International Search Report and Written Opinion Issued in PCT Application No. PCT/US22/028879", Mailed Date: Aug. 9, 2022, 14 Pages.

(Continued)

*Primary Examiner* — Whitney Moore
(74) *Attorney, Agent, or Firm* — Alleman Hall & Tuttle LLP

(57) ABSTRACT

Examples are disclosed that relate to utilizing a facial tracking sensor for controlling computer-generated facial expressions. One example provides a method of controlling computer-generated facial expressions. The method comprises receiving a sensor value acquired via a facial tracking sensor and determining an interpolated value for the sensor value within a value range. The value range corresponding to a blendshape range for a facial expression. The method further comprises determining a blendshape mapping based at least upon the interpolated value, determining expression data based at least upon the blendshape mapping, and providing the expression data to a device.

18 Claims, 11 Drawing Sheets

(56) References Cited

U.S. PATENT DOCUMENTS

| | | |
|---|---|---|
| 2009/0219039 A1 | 9/2009 | Fasshauer |
| 2011/0175602 A1 | 7/2011 | Wang et al. |
| 2016/0349839 A1 | 12/2016 | Ohba |
| 2018/0004478 A1 | 1/2018 | Chen |
| 2018/0033190 A1 | 2/2018 | Ma et al. |
| 2018/0158246 A1 | 6/2018 | Grau et al. |
| 2019/0212822 A1 | 7/2019 | Keller et al. |
| 2019/0275419 A1 | 9/2019 | Sun |
| 2019/0286406 A1 | 9/2019 | Chen |
| 2019/0325633 A1 | 10/2019 | Miller, IV |
| 2019/0333262 A1 | 10/2019 | Chen et al. |
| 2019/0346928 A1 | 11/2019 | Shahmohammadi |
| 2020/0402284 A1 | 12/2020 | Saragih |
| 2021/0141444 A1 | 5/2021 | Speelman et al. |
| 2021/0240279 A1 | 8/2021 | Harviainen et al. |
| 2021/0271316 A1 | 9/2021 | Kozlowski |
| 2022/0100271 A1 | 3/2022 | Hulbert |
| 2022/0404175 A1 | 12/2022 | Jadidian et al. |
| 2023/0213361 A1 | 7/2023 | Jadidian |
| 2023/0368453 A1 | 11/2023 | Jakubzak |

OTHER PUBLICATIONS

U.S. Appl. No. 17/808,049, filed Jun. 21, 2022.

Hickson, et al., "Eyemotion: Classifying Facial Expressions in VR Using Eye-Tracking Cameras", In Repository of arXiv:1707.07204v2, Jul. 28, 2017, 10 Pages.

Romera-Paredes, et al., "Facial Expression Tracking from Head-Mounted, Partially Observing Cameras", In Proceedings of the IEEE International Conference on Multimedia and Expo (ICME), Jul. 2014, 6 Pages.

Zhao, et al., "Emotion Recognition Using Wireless Signals", In Proceedings of the Communications of the ACM, vol. 61, Issue 9, Sep. 2018, pp. 91-100.

"Display systems research: Reverse passthrough VR", Retrieved From: https://research.facebook.com/blog/2021/08/display-systems-research-reverse-passthrough-vr/, Aug. 2, 2021, 7 Pages.

"International Search Report and Written Opinion Issued in PCT Application No. PCT/US23/013374", Mailed Date: May 17, 2023, 12 Pages.

"International Search Report and Written Opinion Issued in PCT Application No. PCT/US23/013448", Mailed Date: Jun. 28, 2023, 14 Pages.

"Invitation to Pay Additional Fees in PCT Application No. PCT/US23/013448", Mailed Date: Apr. 24, 2023, 9 Pages.

Thies, et al., "FaceVR: Real-Time Gaze-Aware Facial Reenactment in Virtual Reality", In Journal of ACM Transactions on Graphics, vol. 37, Issue 2, Jun. 29, 2018, 15 Pages.

Alanis, et al., "3D Gesture Recognition Through RF Sensing", In Technical Report of Microsoft, MSR-TR-2014-81, Jun. 2014, 14 Pages.

Non-Final Office Action mailed on Aug. 6, 2024, in U.S. Appl. No. 17/808,049, 18 pages.

Notice of Allowance mailed on Feb. 28, 2023, in U.S. Appl. No. 17/349,711, 07 pages.

Notice of Allowance mailed on Nov. 10, 2022, in U.S. Appl. No. 17/349,711, 10 pages.

CONTROLLING COMPUTER-GENERATED FACIAL EXPRESSIONS

BACKGROUND

Avatars are used to represent users of computing devices in many different contexts, including in computer forums, messaging environments, video game environments, and social media. Avatars can take many different forms, including two-dimensional images or three-dimensional characters. Some avatars may be animated. In such examples, image data capturing a user's face may be used to map determined user facial expressions to an animated avatar, thereby controlling the expressions of the animated avatar.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to utilizing a facial tracking sensor for controlling computer-generated facial expressions. One example provides a method of controlling computer-generated facial expressions. The method comprises receiving a sensor value acquired via a facial tracking sensor, and determining an interpolated value for the sensor value within a value range, the value range corresponding to a blendshape range for a facial expression. The method further comprises determining a blendshape mapping based at least upon the interpolated value, determining expression data based at least upon the blendshape mapping, and providing the expression data to a device.

DETAILED DESCRIPTION

As mentioned above, avatars may be used to represent computing device users in a variety of use contexts. However, avatars may present various shortcomings in comparison to face-to-face or video interpersonal interaction. For example, people may rely on seeing expressions on each other's facial expressions as a mode of communication, whereas many avatars provide no indication of a user's expressions during conversation. Some computing systems, such as smart phones, tablets and laptops, may use image data capturing a user's face to control expressions displayed on an avatar. However, such cameras may be difficult to integrate into a compact head-mounted device, and also may consume signification power.

Accordingly, examples are disclosed that relate to controlling the display of computer-generated facial expressions on an avatar utilizing a facial tracking sensor system comprising one or more facial tracking sensors. As described in more detail below, values are received from each facial tracking sensor over time, and a value range is determined for each facial tracking sensor based upon the data received, the value range comprising minimum and maximum values received during a period of time (e.g. during a rolling time window). The value range and incoming sensor values are processed to translate the incoming sensor values to blendshape mappings, wherein the blendshape mappings correspond to locations of the sensor values within the value range. Then, expression data is determined based at least upon the blendshape mapping, and is provided to one or more devices for presentation. In such a manner, a set of facial tracking sensors can be used together to sense overall approximation of an expression of a user and thereby control the expressions of an avatar. The avatar may be presented to other people than the user of the sensor device. This may help with interpersonal communication in an AR and/or VR environment.

Figure 1A:
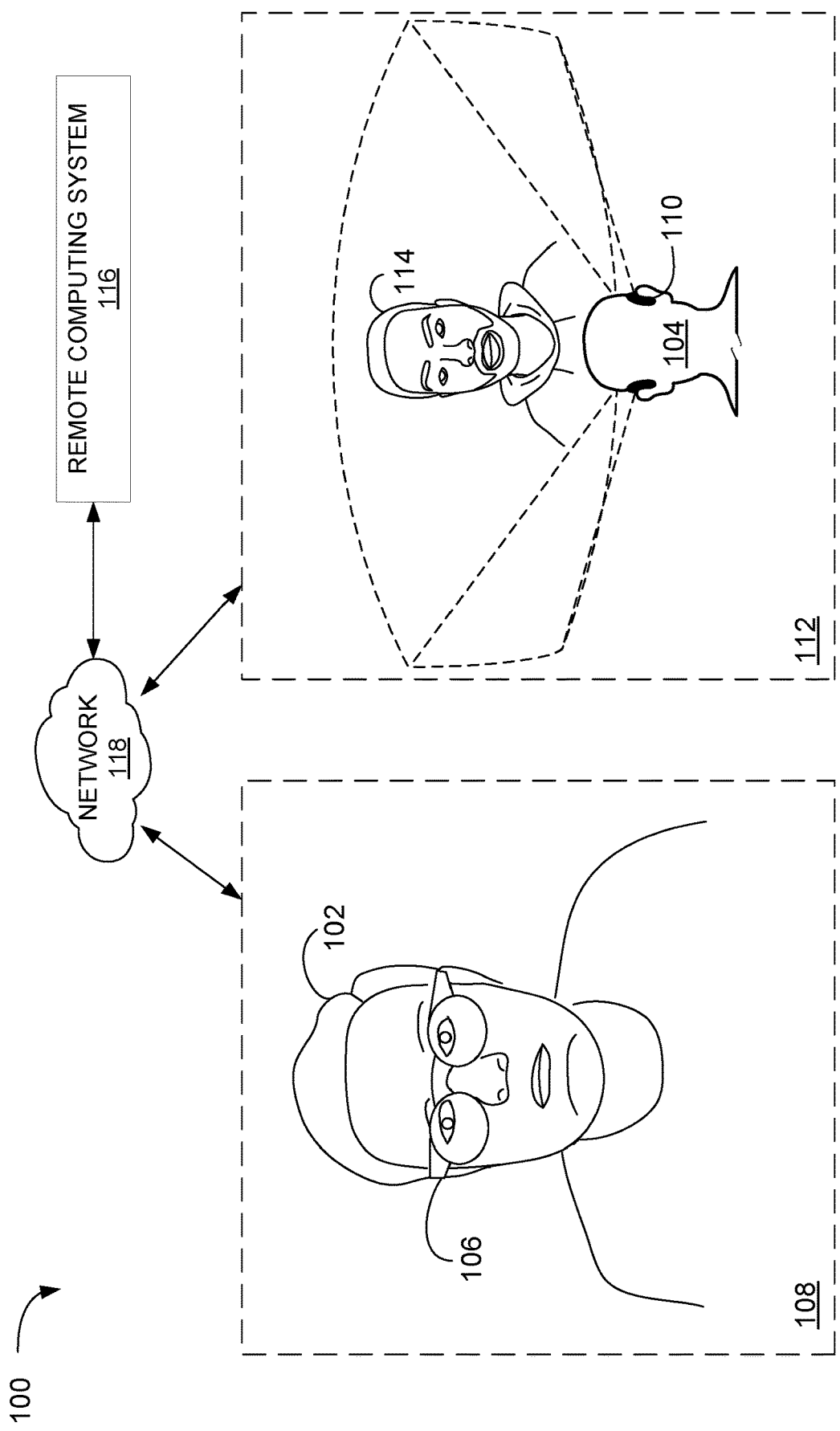
FIGS. 1A and 1B illustrate an example scenario in which sensors on a head-mounted device are used to control computer-generated facial expressions of an animated avatar.
Figure 1B:
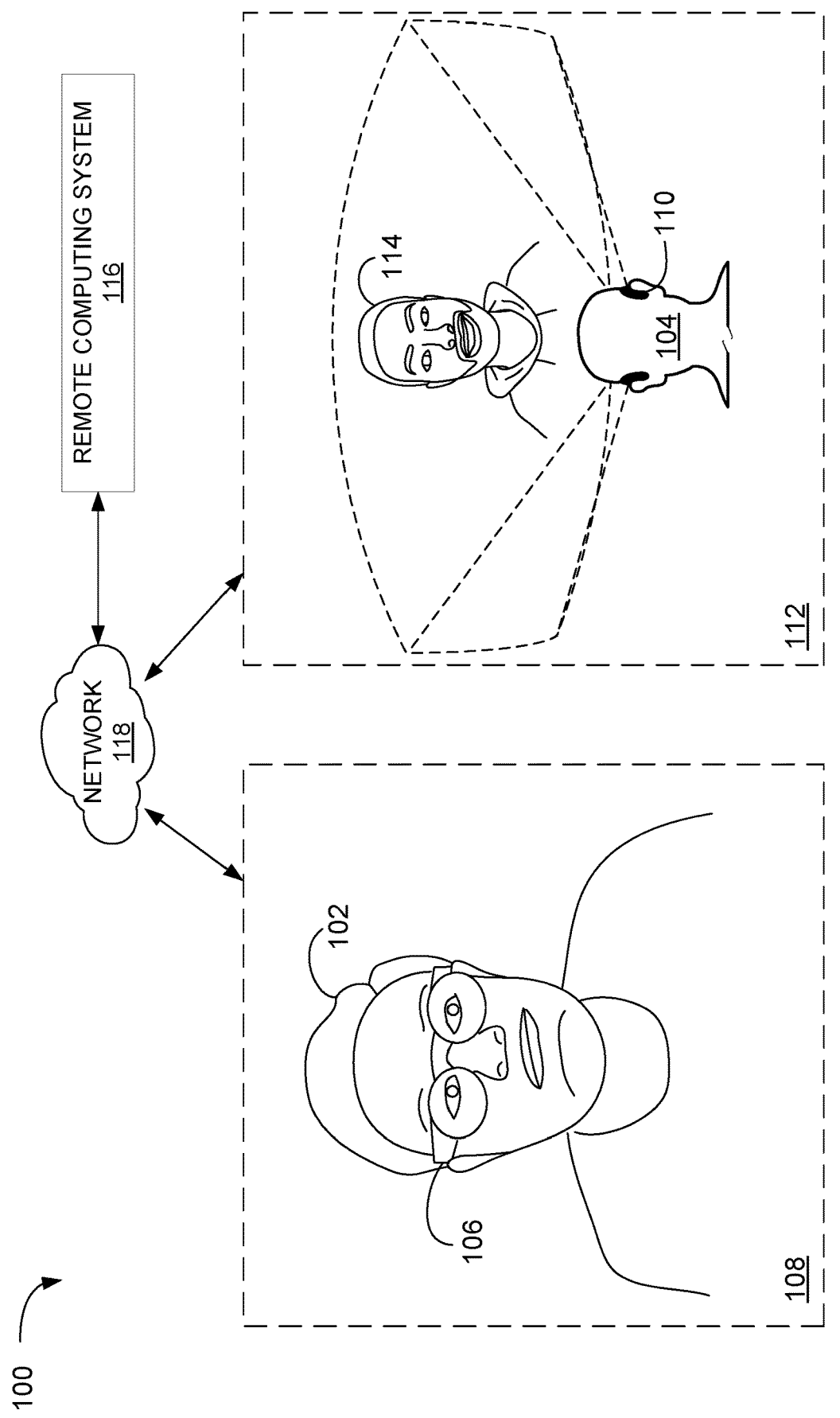

FIGS. 1A and 1B illustrate an example scenario in which an avatar is used to present computer-generated facial expressions. In an AR/VR environment 100, a first user 102 and a second user 104 are communicating. In the depicted example, first user 102 is utilizing a first head-mounted device 106 at a first location 108, and second user 104 is utilizing a second head-mounted device 110 at a second location 112. Second head-mounted device 110 is displaying an avatar 114 representing first user 102. While avatar 114 takes a human form in this example, an avatar may take any other suitable form in other examples.

Avatar 114 displays computer-generated facial expressions based at least in part on sensor data acquired via sensors on first head-mounted device 106. Signals from facial tracking sensors on first head-mounted device 106 are interpreted at runtime, and the signals are mapped to blendshapes representing facial expressions for the avatar. The blendshape mapping is used to obtain expression data, which is then provided to one or display devices. The display devices may use the expression data to display facial expressions, including animations, for the avatar.

First head-mounted device 106 comprises a plurality of facial tracking sensors each of which is configured to detect a proximity of a location on a face of first user 102 to the sensor. Facial tracking sensors may be positioned proximate to various location on the face of first user 102, such as left and right eyebrows, left and right cheeks, and nose bridge.

In some examples, multiple sensors may be used to sense different locations on eyebrows, different location on cheeks, etc. to obtain more detailed data. The data from the plurality of facial tracking sensors collectively represents a facial surface configuration of first user 102, which provides information about the expression of first user 102.

In some examples, first head-mounted device 106 may comprise other sensors, such as eye-tracking cameras and/or an inertial measurement unit (IMU). In such examples, data from such sensors may be used to respectively determine an eye gaze direction and/or a head pose for controlling an eye and/or a head of the avatar, respectively.

In various examples, processing of the sensor data may be performed locally on first head-mounted device 106, on a remote computing system 116 (e.g. a data center server or a local host computing device in various examples) accessible by a network 118 (e.g. a suitable local area network and/or wide area network, such as the internet), or distributed between first head-mounted device 106 and network-accessible remote device 116. The expression data determined is provided to second head-mounted device 110 to control facial animations of avatar 114. As such, in FIG. 1A, avatar 114 has a first facial expression corresponding to a first facial expression of first user 102. Referring next to FIG. 1B, at a later time, avatar 114 has a second facial expression corresponding to a second corresponding facial expression of first user 102.

Figure 2:
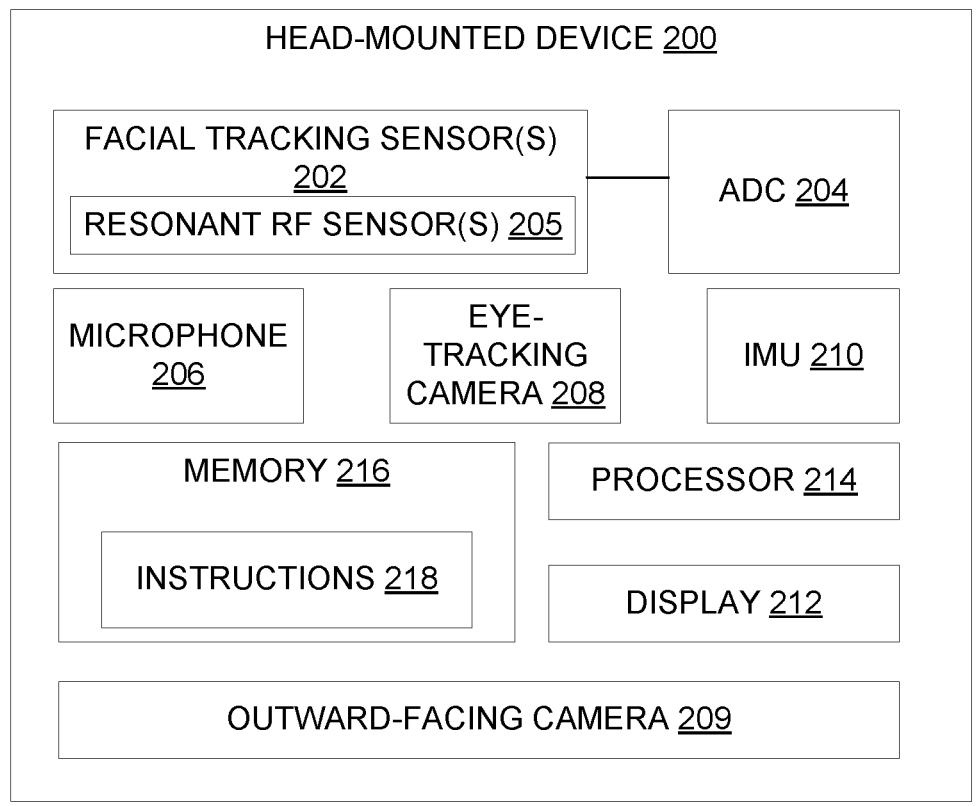
FIG. 2 shows a block diagram of an example head-mounted device configured for facial sensing.

FIG. 2 shows a block diagram of an example head-mounted device 200. First and second head-mounted devices 106 and 110 are examples of head-mounted device 200. Head-mounted device 200 comprises one or more facial tracking sensor(s) 202 and an analog-to-digital converter (ADC) 204 configured to convert analog sensor values from facial tracking sensor(s) 202 to digital sensor values. A sensor value indicates a proximity of a facial tracking sensor from which the value was obtained to a surface of a face. In some examples, one or more facial tracking sensor(s) 202 each may comprise a resonant RF sensor 205. In other examples, facial tracking sensor(s) 202 can comprise another suitable non-camera sensor. Examples include radar sensor(s) and ultrasound sensor(s).

Head-mounted device 200 further may comprise a microphone 206, an eye-tracking camera 208, an outward-facing camera system 209, and/or an IMU 210 in various examples. Audio data acquired via microphone 206 may be used for voice-driven animation, e.g. by linking phonemes to mouth blendshapes. Likewise, data from eye-tracking camera 208 may help to determine a gaze direction to drive eye-related animation of an avatar. Further, data from IMU 210 and/or outward-facing camera system 209 may help to determine a head pose to drive head-related animation of an avatar, potentially in combination with a separate user-facing camera (e.g. a webcam or mobile device camera) (not shown in FIG. 2). Outward-facing camera system 209 may include a depth camera, an intensity image camera (e.g. a color image camera, grayscale camera, or an infrared camera), a stereo camera arrangement, and/or any other suitable camera or arrangement of cameras to allow a position of a user relative to objects in a real-world environment to be tracked. The determined head pose may be used to control animation of the movement of a head of an avatar.

Head-mounted device 200 further comprises a display 212, a processor 214, and computer-readable memory 216 comprising instructions 218 executable by the processor 214 to control the various functionalities of head-mounted device 200, including the determination and display of computer-generated facial expressions.

Figure 3:
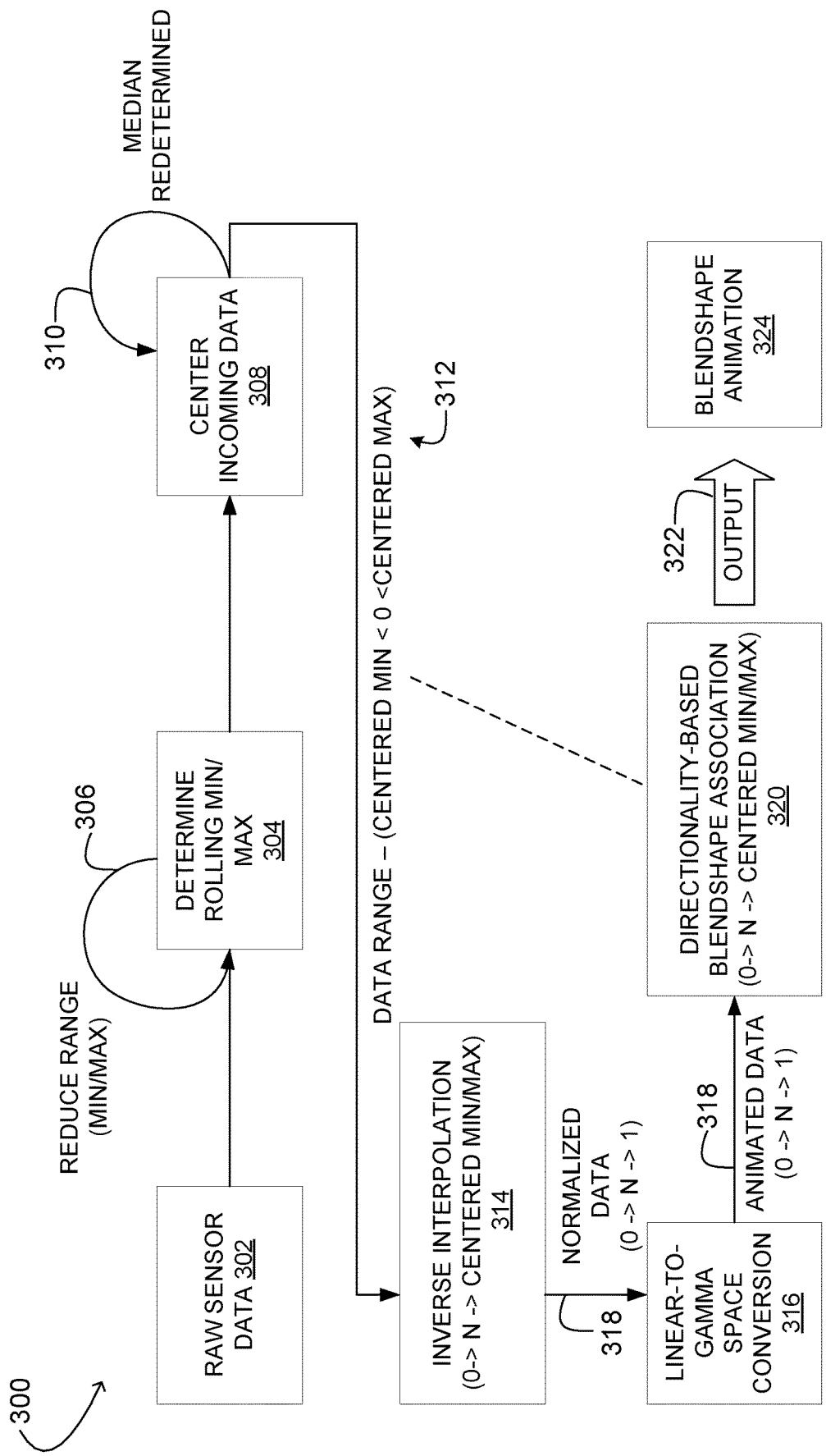
FIG. 3 shows a flow diagram of an example pipeline for controlling an avatar to display computer-generated expressions.

FIG. 3 shows a flow diagram of an example pipeline 300 for controlling computer-generated facial expressions. Pipeline 300 can be implemented as executable instructions on head-mounted devices 106, 110, or 200 and/or on a remote computing system (e.g. remote computing system 116) in communication with head-mounted devices 106, 110, or 200, for example.

Pipeline 300 is configured to estimate a range of sensor values corresponding to a range of motion of a face, and then interpret the sensor values based upon the determined range to map sensor values to blendshapes. The range may be updated in a rolling manner, as described below. Pipeline 300 receives raw sensor data acquired by a facial tracking sensor, as indicated at 302. In the depicted example, the raw sensor data represents digital sensor values received from an ADC. For simplicity, pipeline 300 is depicted for data received from a single facial tracking sensor. It will be understood that pipeline 300 can be replicated in full or in part for sensor data acquired via each additional facial tracking sensor.

Pipeline 300 determines rolling minimum and rolling maximum sensor values at 304. In some examples, to help exclude outlying signals (e.g. data that arises from a bumping of a head-mounted device rather than facial motions), pipeline 300 periodically reduces a range between the rolling minimum and the rolling maximum, as indicated at 306. As one example, the rolling minimum and the rolling maximum can be revaluated by taking a median value and adding/subtracting ¼ of the minimum/maximum respectively. As another example, a middle 80% of the minimum/maximum window may be used for a next time window. The range reduction may be performed at any suitable frequency. In some examples, the range is reduced at a frequency within a range of once every five to fifteen seconds. In other examples, a calibration step can establish minimum/maximum values. In yet other examples, the range can be adjusted in any suitable manner and/or at any suitable frequency.

Continuing, pipeline 300 centers the incoming data at 308. Centering the data may include, at 310 determining a rolling centered median sensor value, as well as centered rolling minimum and centered rolling maximum values. The rolling centered median value may be updated periodically, as indicated at 310. In some examples, the rolling centered median value may be updated at a frequency of once every one to five seconds of time. In other examples, any other suitable update frequency may be used.

As depicted at 312, the resulting data comprises data having values between the centered minimum and the centered maximum, where the centered minimum is less than zero and the centered maximum is greater than zero. In some examples, the centered data may be normalized, while in other examples normalization may be omitted.

In some examples, the centered sensor value is evaluated for directionality of facial movement (e.g. raising or lowering of an eyebrow). Directionality may be determined based on whether the centered sensor value is below or above zero. In such a manner, pipeline 300 can determine a directional relationship between the sensor value and a blendshape mapping. In some examples, a calibration step can be performed to determine sensor directionality, such as for eyebrows, upper cheeks, or other suitable facial groups, as directionality data for a facial tracking sensor may be different for different users. In some such examples, the calibration step can comprise a guided experience in which the user is guided to perform expressions so that a directionality association can be obtained for one or more of the face tracking sensors. In other examples, an image sensor (e.g., an eye-tracking camera) may be configured to identify when the user raises a facial landmark, such as an eyebrow, and associate the directionality of the sensor when that happens. Such calibration steps may help to enable pipeline 300 to be implemented more easily for differently-shaped faces.

Continuing, pipeline 300 determines an interpolation value for each centered data value at 314. In the depicted example, an inverse linear interpolation is performed on the centered sensor value. In other examples, any other suitable interpolation can be used, such as ease-in-out, ease-in, and/or ease-out interpolations.

Figure 4:
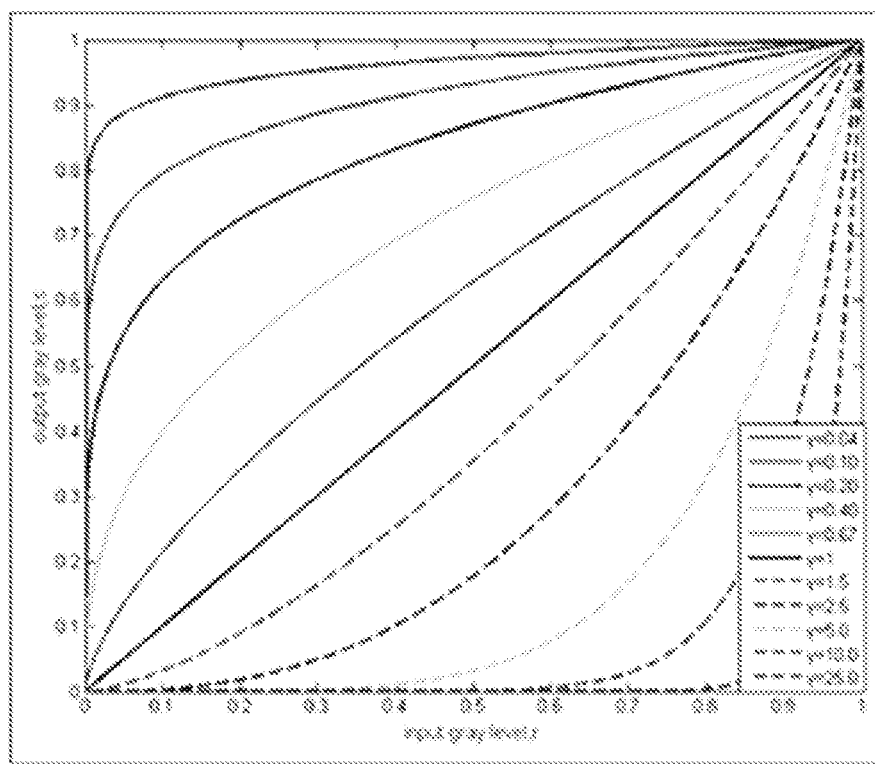
FIG. 4 depicts example plots of linear-to-gamma space conversions suitable for use by the pipeline of FIG. 3.

In some examples, pipeline 300 next may perform a linear-to-gamma space conversion on the interpolated value to form a transformed value at 316. In the depicted example, the transformed value comprises a range of between zero and one, which is the same range of the normalized data obtained from the linear interpolation. However, the linear-to-gamma space conversion may emphasize more subtle facial movements compared to the normalized data from the interpolation at 314. An example linear-to-gamma space conversion plot is shown in FIG. 4. The straight line between (0, 0) and (1, 1) corresponds to the interpolated value prior to the gamma space conversion, whereas the curved lines correspond to gamma values given in the legend at the bottom right corner of FIG. 4. The linear-to-gamma space conversion may help to get meaningful and more natural looking movements out of the computer-generated facial expressions.

Returning to FIG. 3, after optionally performing the linear-to-gamma space conversion, pipeline 300 determines a directionality-based blendshape mapping based on the transformed value at 320. In some examples, the transformed value is associated with a blendshape mapping and multiplied by a corresponding blendshape weight of a blendshape node.

In some facial expressions, a facial movement in a first location may be reflected other location(s) of a face. As such, a list of linked blendshape nodes can be used to link sensed movement of one facial location to the other locations linked with the first location. For example, a sensed movement of a cheek may correspond to a movement of a corner of a mouth. As such, a blendshape node for a cheek may be linked to a blendshape node for the corner of the mouth, allowing the sensed motion of the cheek to affect the shape of the mouth in a displayed avatar. In this manner, a one-to-many blendshape association per-sensor, and/or a cross-sensor analysis to determine what the face is likely doing, may be performed. In examples where the linear-to-gamma space conversion is omitted, the blendshape mapping can be based directly on the interpolated value.

Continuing with FIG. 3, pipeline 300 determines expression data based at least on the blendshape mapping and outputs the expression data, as indicated at 322. For example, the expression data may take the form of a blendshape animation, as indicated at 324. The blendshape animation can be used to animate the facial expressions of an avatar. The interpolation methods and/or the linear-to-gamma space conversions used in pipeline 300 may impact the manner in which the expression data is animated.

Figure 5:
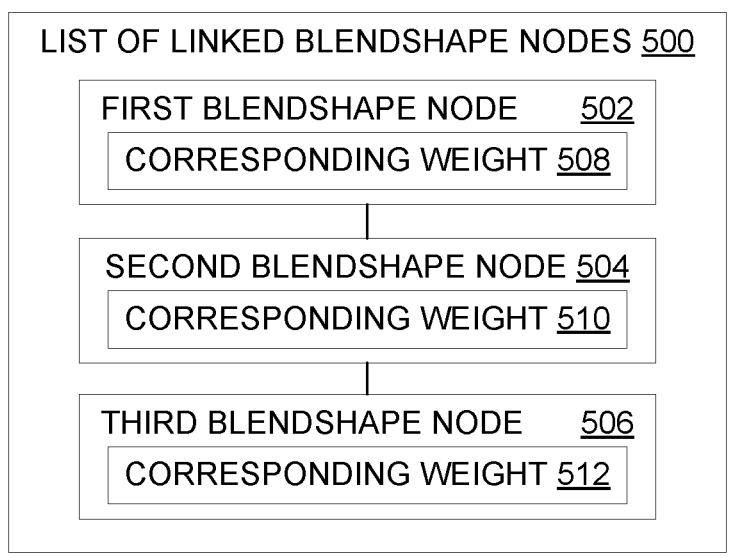
FIG. 5 shows a block diagram of an example list of linked blendshape nodes.

As mentioned above, in some examples a blendshape mapping for an interpolated or transformed value can be determined for each blendshape node of a list of linked blendshape nodes. FIG. 5 shows an example list of linked blendshape nodes 500. In the depicted example, list of linked blendshape nodes 500 comprises a first blendshape node 502, a second blendshape node 504, and a third blendshape node 506. As mentioned above, such a configuration can establish a one-to-many association between a sensor value acquired via a facial tracking sensor and blendshapes the sensor value may affect. As an example, a facial tracking sensor directed toward an eyebrow of a user may affect an eyebrow blendshape and an eyelid blendshape. In other examples, list of linked blendshape nodes 500 can comprise any suitable number of blendshape nodes.

In some examples, a plurality of lists of linked blendshape nodes 500 may be stored, where each list in the plurality of lists can be associated with a different facial tracking sensor. Such a configuration may help to determine blendshape mappings from each a plurality of facial tracking sensors directed towards a plurality of areas of a face. Further, each blendshape node 502, 504, 506 comprises a corresponding weight 508, 510, and 512, respectively. Corresponding weight 508 indicates how much of the sensor value affects the blendshape mapping of first blendshape node 502. Similarly, corresponding weights 510 and 512 can indicate how much of the sensor value affects the blendshape mappings of second and third blendshape nodes 504 and 506, respectively. In some examples, each blendshape node 502, 504, 506 can further comprise a threshold value used to indicate a directionality. For example, when a sensor value acquired via an eyebrow sensor goes up, an animated eyebrow raises, and when the sensor value goes down, the animated eyebrow lowers. Such a configuration may help to determine expression data across multiple users with different facial landmark positions.

Figure 6:
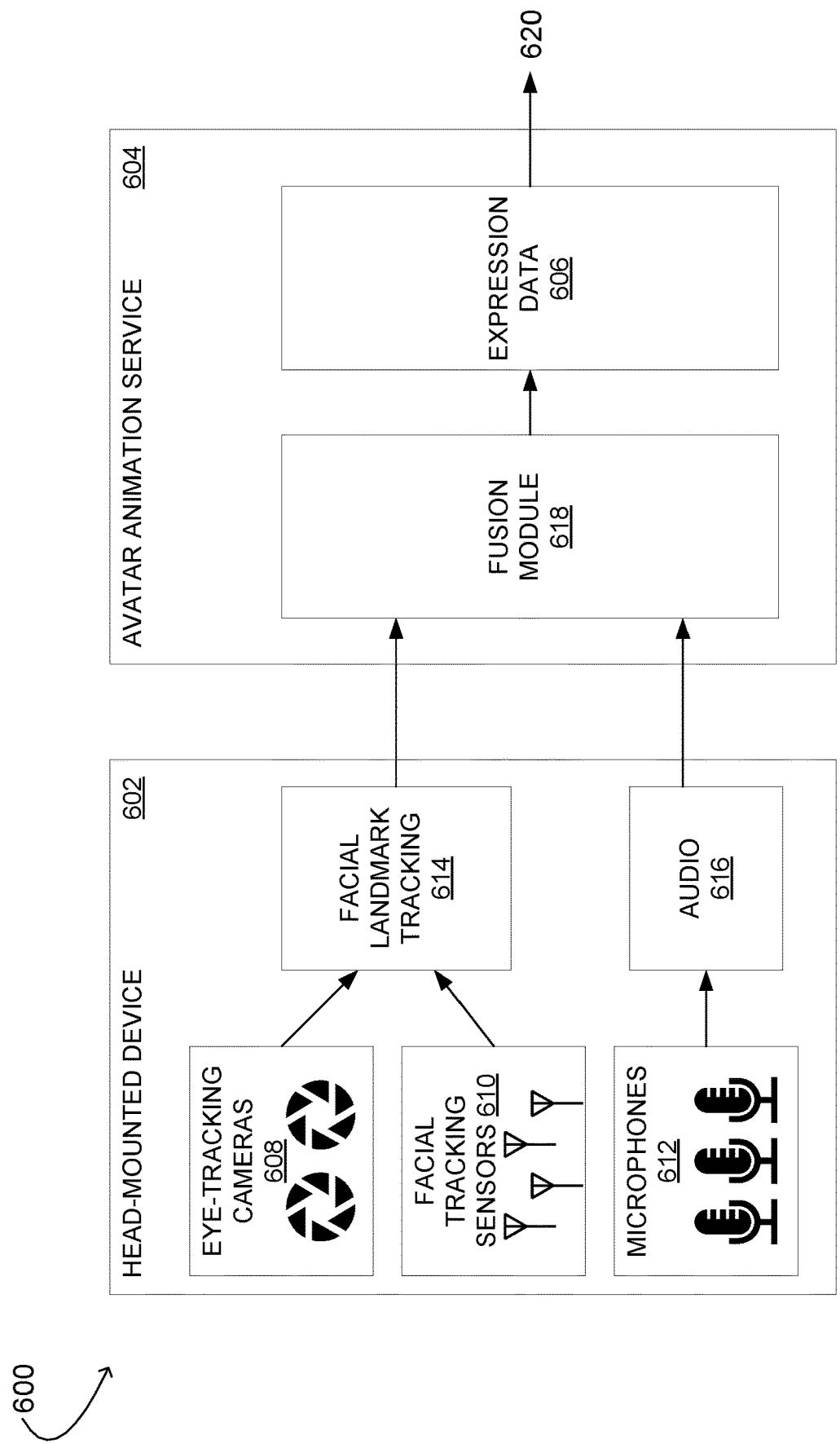
FIG. 6 shows a block diagram of an example computing system for controlling computer-generated facial expressions via sensor data fusion.

In some examples, data from multiple different types of sensors may be used to determine expression data. FIG. 6 shows an example computing system 600 for controlling computer-generated facial expressions utilizing multiple modes of sensor data. Computing system 600 comprises a head-mounted device 602 configured to acquire sensor data indicating a facial expression. Computing system 600 further comprises an avatar animation service 604 configured to determine expression data 606 based on the sensor data from head-mounted device 602. In some examples, avatar animation service 604 can be hosted on a server remote from head-mounted device (e.g. on a device accessible by a local area and/or wide area computer network). In other examples, avatar animation service 604 can be hosted on a head-mounted device 602. Head-mounted devices 106, 110, and 200 are examples of head-mounted device 602.

Head-mounted device 602 comprises one or more eye-tracking cameras 608, one or more facial tracking sensors 610, and one or more microphones 612. Head-mounted device 602 is configured to determine facial landmark tracking data 614 based upon data acquired via facial tracking sensors 610 and eye-tracking cameras 608. Such a configuration may help to track facial landmark movement, including a gaze direction in some examples. Head-mounted device 602 is further configured to acquire audio data 616 via microphones 612.

Avatar animation service 604 comprises fusion module 618 configured to determine expression data 606 from facial landmark tracking data 614 and audio data 616. In some examples, fusion module 618 can utilize pipeline 300 to process data from facial tracking sensors 610. In some examples, fusion module 618, further can determine voice-driven animation based on audio data 616 (e.g., by determining one or more visemes based upon detected phonemes). This may allow animations for portions of a face not sensed by a facial tracking sensor 610 to be produced based upon the audio data 616.

Avatar animation service 604 is further configured to provide expression data 606 to a device, as indicated at 620. The device can be head-mounted device 602, a different head-mounted device, or any other suitable display device. In such a manner, computing system 600 may utilize a power-light set of facial tracking sensors in combination with eye-tracking cameras and microphones to create a simulacrum of a user's facial expression based on the input readings of those sensors synthesized into a final output indicating expression data. In other examples, other sensors may be used to provide additional data for avatar animation. For example, sensors such as an IMU and/or cameras (internal or external to a head-mounted device) may be used to drive animation of head motion of an avatar.

Figure 7:
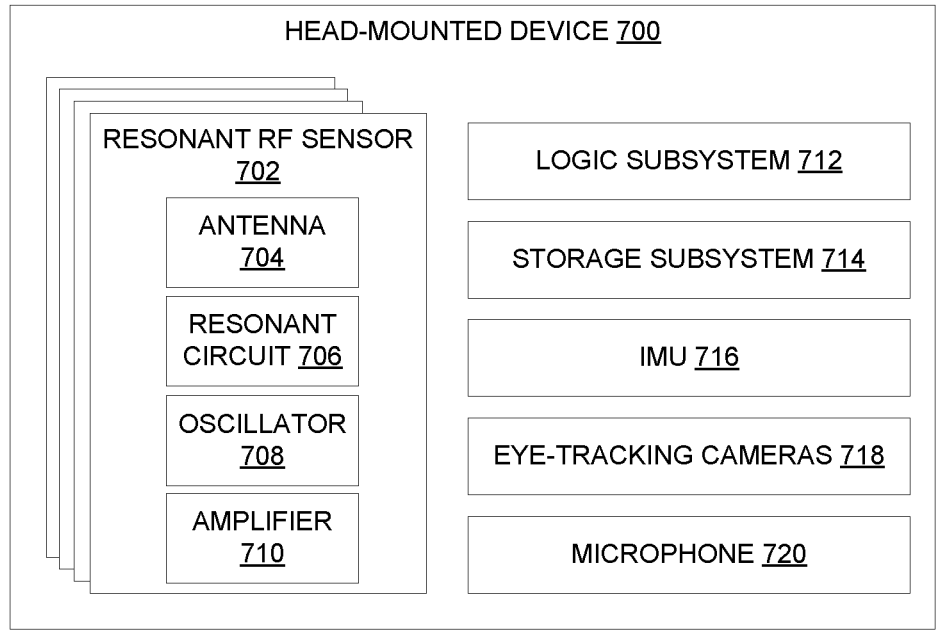
FIG. 7 shows a block diagram of an example head-mounted device that utilizes a radiofrequency (RF) antenna system for facial tracking.

As previously mentioned, in some examples a facial tracking sensor may comprise a resonant RF sensor. FIG. 7 shows a block diagram of head-mounted device 700 comprising a plurality of resonant RF sensors 702 each configured to output a signal responsive to a position of a surface proximate to the corresponding resonant RF sensor. Each resonant RF sensor comprises an antenna 704, a resonant circuit 706, an oscillator 708, and an amplifier 710. Here, the resonant circuit 706 comprises capacitance and/or inductance of antenna 704 combined with one or more other reactive components.

Each antenna 704 is configured for near-field electromagnetic detection. In some examples, each antenna 704 may comprise a narrowband antenna with a quality factor in the range of 150 to 2000. The use of a such narrowband antenna may provide for greater sensitivity than an antenna with a lower quality factor. The oscillator 708 and amplifier 710 are configured to generate an oscillating signal on the antenna. In some examples, the oscillating signal is selected to be somewhat offset from a target resonant frequency of the resonant RF sensor (e.g. a resonant frequency that is often experienced during device use, such as a resonant frequency when a face is in a rest state), as such a configuration may provide for lower power operation than where the oscillating signal is more often at the resonant frequency of the resonant RF signal.

Head-mounted device 700 further comprises a logic subsystem 712 and a storage subsystem 714. In the head-mounted device example, logic subsystem 712 may execute instructions stored in the storage system 712 to control each resonant RF sensor 702, and to determine data regarding face tracking based upon signals received from each resonant RF sensor 702. Logic subsystem 712 may be configured to detect facial inputs (e.g. motions and/or poses) using any suitable method. As a more detailed example, the instructions stored in the storage subsystem 714 may be configured to perform any suitable portion of pipeline 300.

Head-mounted device 700 may further comprise an IMU 716. IMU data from the IMU 716 may be used to detect changes in position of the head-mounted device, and may help to distinguish device movements (e.g. a device being adjusted on or removed from the head) from facial movements. In some examples, IMU data may be used at least in part to drive animation of avatar head motion. Further, head-mounted device 700 includes one or more eye-tracking cameras 718 and a microphone 720.

Figure 8:
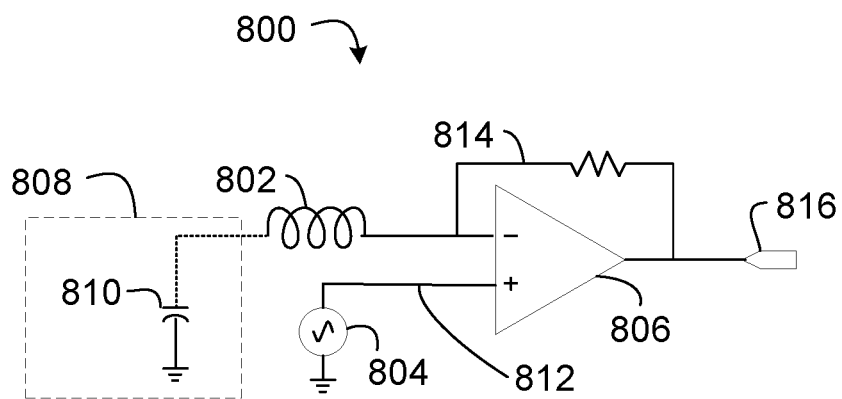
FIG. 8 shows an example resonant RF sensor circuit suitable for use with the head-mounted device of FIG. 7.

FIG. 8 shows a circuit diagram of an example resonant RF sensor 800. Resonant RF sensor 800 may be used as a resonant RF sensor in head-mounted device 700 of FIG. 7 for example. Resonant RF sensor 800 comprises an inductor 802, an oscillator 804, an amplifier 806, and an antenna 808, the antenna comprising a capacitance represented by capacitor 810. The oscillator 804 is configured to output a driven signal on node 812, and the amplifier 806 is configured to generate an oscillating signal in the antenna based upon the driven signal received at node 812 via feedback loop 814.

The capacitance 810 of the antenna 808 and the inductor 802 form a series resonator. The capacitance of the antenna 808 is a function of a surface proximate (e.g. a face) to the antenna 808, and thus varies based on changes in a position of the surface proximate to the sensor. Changes in the capacitance at capacitor 810 changes the resonant frequency of the series resonator, which may be sensed as a change in one or more of a phase and an amplitude of a sensor output detected at output node 816. In some examples, a separate capacitor may be included to provide additional capacitance to the resonant circuit, for example, to tune the resonant circuit to a selected resonant frequency.

Figure 9:
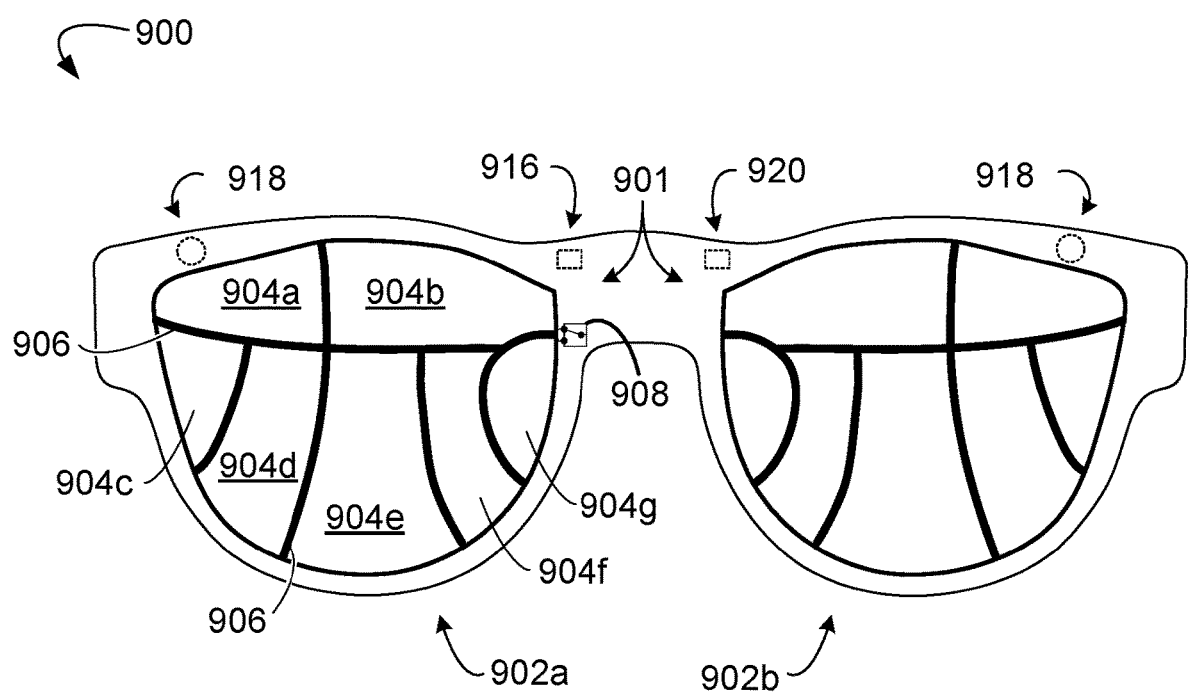
FIG. 9 shows a front view of an example head-mounted device illustrating an example antenna layout.

FIG. 9 shows a front view of an example head-mounted device 900 illustrating an example antenna layout 901 for a plurality of resonant RF sensors. Head-mounted device 900 is an example of head-mounted devices 106, 110, 200, 602, and 900. Head-mounted device 900 includes a lens system comprising lenses 902a and 902b for right and left eyes, respectively. The antenna layout on each lens in this example comprises seven antennas formed on a transparent substrate. While the example depicted comprises seven antennas 904a-904g per lens, in other examples, any suitable antenna layout with any suitable number of antennas may be used. Head-mounted device 900 further may include one or more switches, indicated schematically at 908, to selectively connect antennas together. Switches can be used to change the radiation pattern emitted by the antennas.

As shown on lens 902a, antennas 904a-g are separated by trench regions 906, indicated by thick dark lines. Trench regions 906 are regions between antennas that lack an electrically conductive film(s) that form antennas 904a-g. In some examples, trench regions 906 may comprise electrically conductive traces to carry signals to and/or from antennas 904a-g to other circuitry. Trench regions 906 may be formed by masking followed by deposition of the conductive film for the antennas, or by etching after forming the conductive film, in various examples. In some examples, trench regions are etched into the lens or other substrate.

As a conductive film from which the antennas 904a-g are formed may not be fully transparent, the antenna layout may be visible to a user in some examples. However, when incorporated into a device configured to be worn on the head, the antenna layout may be positioned closer than a focal length of the human eye during most normal use of head-mounted device 900. As such, the layout may be out of focus to a user during ordinary device use, and thus may not obstruct the user's view or distract the user.

Figure 10A:
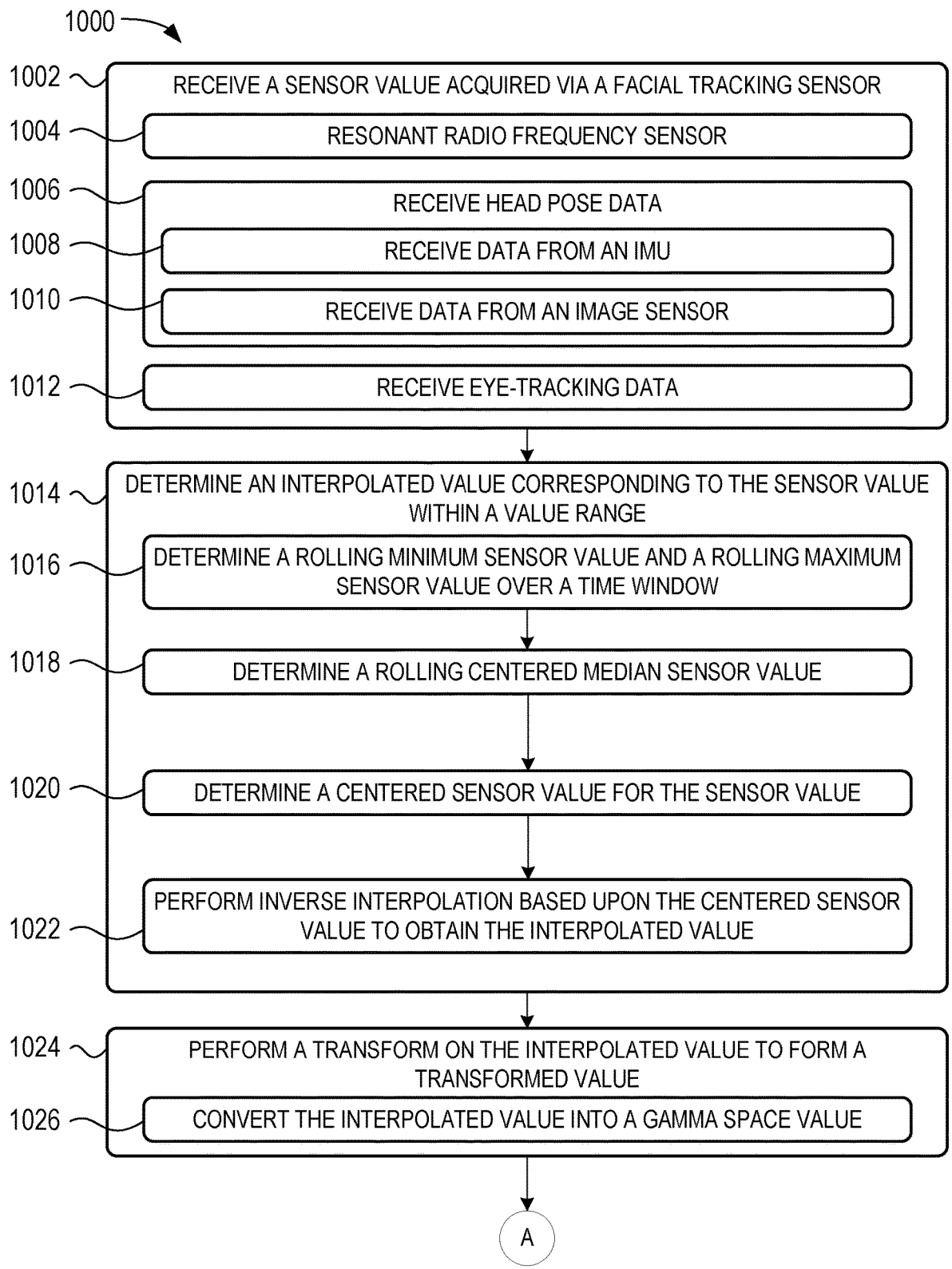
FIGS. 10A and 10B show a flow diagram of an example method for controlling computer-generated facial expressions.
Figure 10B:
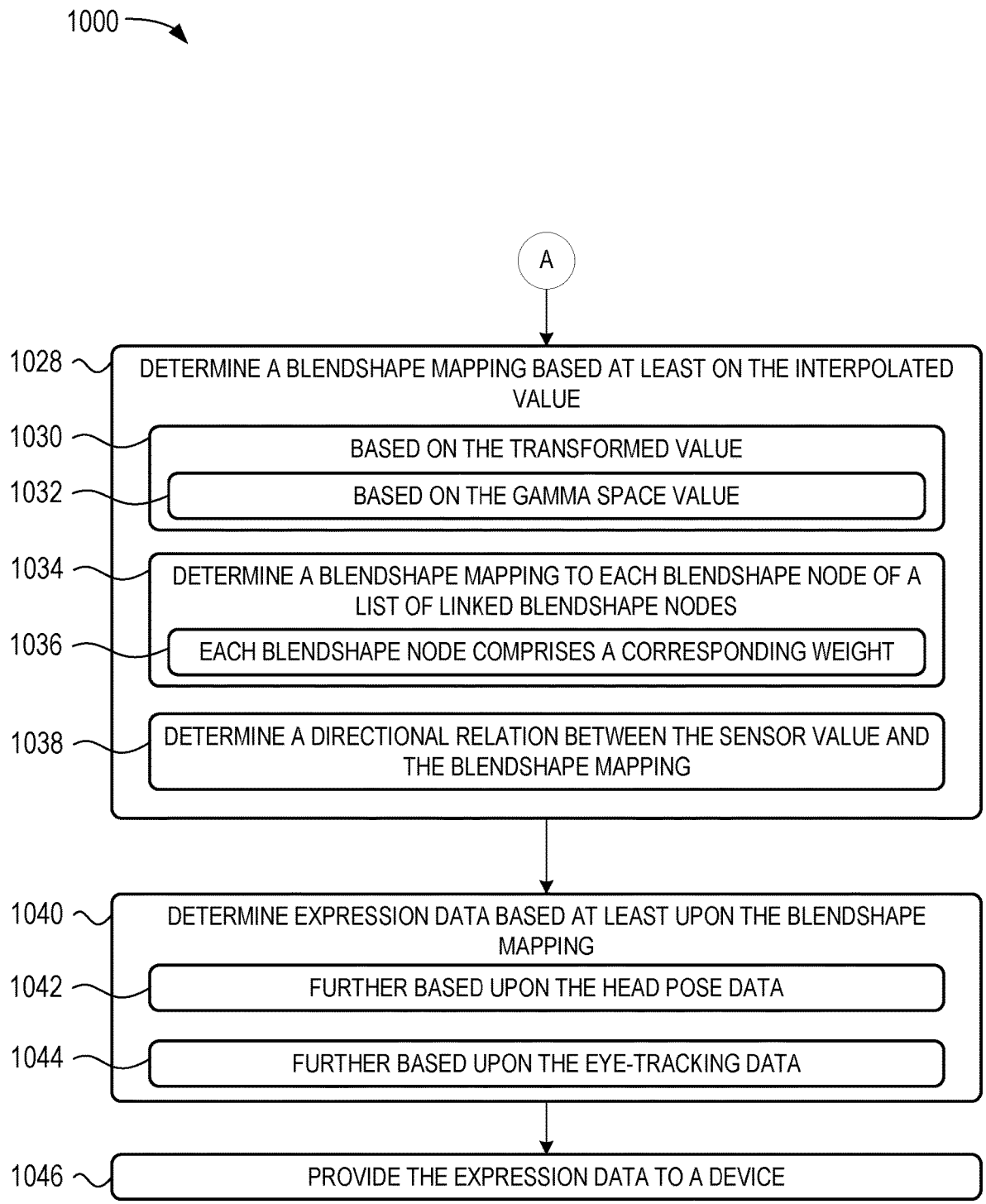

FIGS. 10A and 10B show a flow diagram of an example method 1000 of controlling computer-generated facial expressions. Method 1000 may be performed by head-mounted devices 106, 110, 200, 602, and 700, and avatar animation service 604, as examples. Method 1000 comprises, at 1002, receiving a sensor value acquired via a facial tracking sensor. In some examples, the facial tracking sensor comprises a resonant RF sensor, as indicated at 1004. In other examples, any suitable sensor that detects a proximity to a face may be used, such as a radar sensor, an ultrasound sensor, or any other suitable non-camera sensor.

In some examples, method 1000 may comprise, at 1006, receiving head pose data. In some such examples, the head pose data may be received from an IMU unit. In other examples, head pose data alternatively or additionally may be received from an image sensor. In some examples, the image sensor may comprise an outward-facing image sensor on the head-mounted device. In such examples, a detected change of orientation of the head-mounted device relative to an environment may be indicative of head motion. In other examples, an external user-facing camera may be used to sense head motion. Further, in some examples, method 1000 comprises, at 1012, receiving eye-tracking data. In other examples, steps 1006, 1008, 1010, and/or 1012 may be omitted.

Method 1000 further comprises, at 1014, determining an interpolated value for the sensor value within a value range. The value range corresponds to a blendshape range for a facial expression. The interpolated value may represent a location of the sensor value within the value range. In some examples, method 1000 comprises, at 1016, determining a rolling minimum sensor value and a rolling maximum sensor value received during a period of time. The rolling minimum sensor value and the rolling maximum sensor value are based upon a range of received sensor values, and the period of time may comprise a rolling window. Method 1000 further may comprises, at 1018, determining a rolling centered median value, and at 1020, determining a centered sensor value based at least upon the rolling centered median sensor value, the rolling centered minimum, and the rolling centered maximum. Method 1000 additionally may comprise interpolating the centered sensor value. In some examples, method 1000 may comprise performing an inverse interpolation based upon the centered sensor value to obtain the interpolated value, as indicated at 1022. In other examples, any other suitable interpolation may be used.

In some examples, method 1100 may comprise, at 1124, performing a transform on the interpolated value to form a transformed value. In some such examples, the transform may comprise, at 1126, converting the interpolated value into a gamma space value. This conversion may help to generate more meaningful and natural looking computer-generated facial expressions. In other examples, method 1100 may omit 1124 and/or 1126.

Continuing, method 1000 comprises, at 1028, determining a blendshape mapping based at least upon the interpolated value. In some examples, the interpolated value itself is mapped to the blendshape. In other examples, where the interpolated value is transformed to the transformed value, the blendshape mapping may be based upon the transformed value.

In some examples, method 1000 comprises, at 1034, determining a blendshape mapping to each blendshape node of a list of linked blendshape nodes. Such a configuration can help to determine a one-to-many association between a sensor value received and blendshapes the sensor value may affect. In some such examples, each blendshape node comprises a corresponding weight, as indicated at 1036. The corresponding weight may indicate a percentage of the sensor value that affects a target blendshape. Such a manner may help to get meaningful and more natural looking movements out of the computer-generated facial expressions. Continuing, method 1000 comprises, at 1038, determining a directional relationship between the sensor value and the blendshape mapping. This may be performed based upon a calibration performed previously. Such a configuration may help to adjust for different facial landmark positioning across multiple users.

Continuing, method 1100 comprises, at 1040, determining expression data based at least upon the blendshape mapping. In examples where the head pose data is received, the expression data can be further based upon the head pose data, indicated at 1042. Additionally, in examples where eye-tracking data is received, the expression data further may be based upon the eye-tracking data, as indicated at 1044. Method 1000 additionally comprises, at 1046, providing the expression data to a device. In some examples, the expression data may be provided to more than one device.

The disclosed examples of controlling computer-generated facial expressions help to produce facial animations of an avatar and may help communication between users in an AR and/or VR environment. Further, utilizing resonant RF sensors to power the facial animations may help to increase an availability of facial tracking data.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
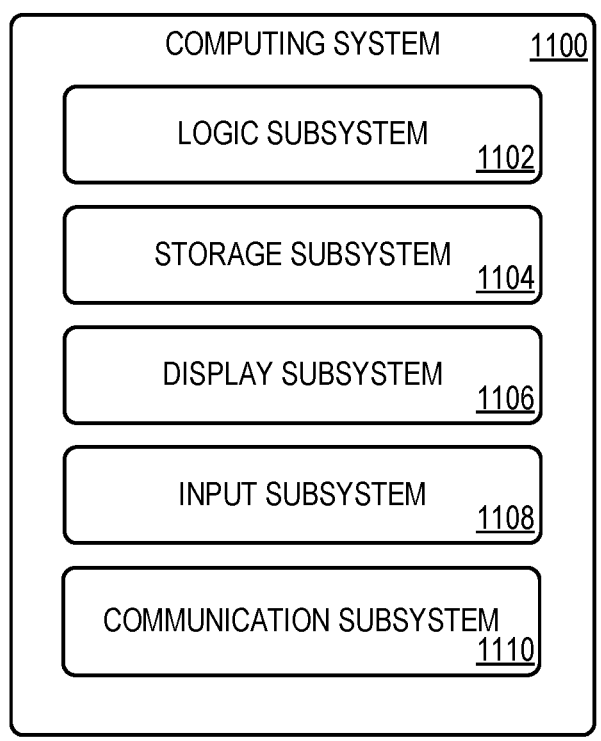
FIG. 11 shows a block diagram of an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices. head-mounted device 106, head-mounted device 110, head-mounted device 200, computing system head-mounted device 602, a computing system hosting avatar animation service 604, and head-mounted device 700 are examples of computing system 1100.

Computing system 1100 includes a logic subsystem 1102 and a storage subsystem 1104. Computing system 1100 may optionally include a display subsystem 1106, input subsystem 1108, communication subsystem 1110, and/or other components not shown in FIG. 11.

Logic subsystem 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 1104 includes one or more physical devices configured to hold instructions executable by the logic machine to implement the methods and processes described herein. When such methods and processes are implemented, the state of storage subsystem 1104 may be transformed—e.g., to hold different data.

Storage subsystem 1104 may include removable and/or built-in devices. Storage subsystem 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1104 may include volatile, nonvolatile, dynamic, static, read/write, read-only, random-access, sequential-access, location-addressable, file-addressable, and/or content-addressable devices.

It will be appreciated that storage subsystem 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1102 and storage subsystem 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 1100 implemented to perform a particular function. In some cases, a module or program may be instantiated via logic subsystem 1102 executing instructions held by storage subsystem 1104. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage subsystem 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic subsystem 1102 and/or storage subsystem 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Another example provides a method of controlling computer-generated facial expressions, the method comprising receiving a sensor value acquired via a facial tracking sensor, determining an interpolated value for the sensor value within a value range, the value range corresponding to a blendshape range for a facial expression, determining a blendshape mapping based at least upon the interpolated value, determining expression data based at least upon the blendshape mapping, and providing the expression data to a device. In some such examples, determining the interpolated value alternatively or additionally comprises determining a rolling minimum sensor value and a rolling maximum sensor value received during a period of time. In some such examples, determining the interpolated value alternatively or additionally comprises centering the rolling minimum sensor value to form a rolling centered minimum, and centering the rolling maximum sensor value to form a rolling centered maximum. In some such examples, determining the interpolated value alternatively or additionally comprises determining a rolling centered median sensor value and determining a centered sensor value based at least upon the rolling centered median sensor value, the rolling centered minimum, and the rolling centered maximum, and interpolating the centered sensor value. In some such examples, the method alternatively or additionally comprises performing a transform on the interpolated value to form a transformed value, and determining the blendshape mapping based at least upon the interpolated value alternatively or additionally comprises determining the blendshape mapping based on the transformed value. In some such examples, performing the transform on the interpolated value alternatively or additionally comprises converting the interpolated value into a gamma space value, and determining the blendshape mapping alternatively or additionally comprises determining the blendshape mapping based on the gamma space value. In some such examples, determining the blendshape mapping based at least upon the interpolated value alternatively or additionally comprises determining a blendshape mapping to each blendshape node of a list of linked blendshape nodes. In some such examples, each blendshape node alternatively or additionally comprises a corresponding weight. In some such examples, the method alternatively or additionally comprises determining a directional relationship between the sensor value and the blendshape mapping. In some such examples, the facial tracking sensor alternatively or additionally comprises a resonant radio frequency sensor.

Another example provides a computing system comprising a facial tracking sensor, a logic system, and a memory system comprising instructions executable by the logic system to receive a sensor value acquired via the facial tracking sensor, determine an interpolated value within a value range, the value range corresponding to a blendshape range for a facial expression, determine a blendshape mapping based at least upon the interpolated value, determine expression data based at least upon the blendshape mapping, and provide the expression data to another computing device. In some such examples, the instructions executable to determine the interpolated value alternatively or additionally comprise instructions executable to center a rolling minimum sensor value to form a rolling centered minimum, and center a rolling maximum sensor value to form a rolling centered maximum. In some such examples, the instructions executable to determine the interpolated value alternatively or additionally comprise instructions executable to determine a rolling centered median sensor value and determine a centered sensor value based at least upon the rolling centered median sensor value, the rolling centered minimum, and the rolling centered maximum, and to interpolate the centered sensor value. In some such examples, the instructions are alternatively or additionally executable to perform a transform on the interpolated value to form a transformed value, and the instructions executable to determine the blendshape mapping based at least upon the interpolated value alternatively or additionally comprise determine the blendshape mapping based on the transformed value. In some such examples, the instructions executable to determine the blendshape mapping based at least upon the interpolated value alternatively or additionally comprise instructions executable to determine a blendshape mapping to each blendshape node of a list of linked blendshape nodes. In some such examples, the instructions are alternatively or additionally executable to determine a directional relationship between the sensor value and the blendshape mapping. In some such examples, the facial tracking sensor alternatively or additionally comprises a resonant radio frequency sensor.

Another example provides a method of controlling computer-generated facial expressions, comprising receiving a sensor value acquired via a facial tracking sensor, receiving head pose data, determining an interpolated value for the sensor value within a value range, the value range corresponding to a blendshape range for a facial expression, determining a blendshape mapping based at least upon the interpolated value, determining expression data based at least upon the blendshape mapping and the head pose data, and providing the expression data to a device. In some such examples, the facial tracking sensor alternatively or additionally comprises a resonant radio frequency sensor. In some such examples, receiving the head pose data alternatively or additionally comprises one or more of receiving data from an inertial measurement unit or receiving data from an image sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of controlling computer-generated facial expressions, the method comprising:
   receiving a sensor value acquired via a facial tracking sensor;
   determining an interpolated value for the sensor value within a value range, the value range corresponding to a blendshape range for a facial expression;
   determining a blendshape mapping for each blendshape node of a list of linked blendshape nodes based at least upon the interpolated value;
   determining expression data based at least upon the blendshape mapping; and
   providing the expression data to a device.

2. The method of claim 1, wherein determining the interpolated value comprises determining a rolling minimum sensor value and a rolling maximum sensor value received during a period of time.

3. The method of claim 2, wherein determining the interpolated value further comprises centering the rolling minimum sensor value to form a rolling centered minimum, and centering the rolling maximum sensor value to form a rolling centered maximum.

4. The method of claim 3, wherein determining the interpolated value further comprises determining a rolling centered median sensor value and determining a centered sensor value based at least upon the rolling centered median sensor value, the rolling centered minimum, and the rolling centered maximum, and interpolating the centered sensor value.

5. The method of claim 4, further comprising performing a transform on the interpolated value to form a transformed value, and wherein determining the blendshape mapping based at least upon the interpolated value comprises determining the blendshape mapping based on the transformed value.

6. The method of claim 5, wherein performing the transform on the interpolated value comprises converting the interpolated value into a gamma space value, and wherein determining the blendshape mapping comprises determining the blendshape mapping based on the gamma space value.

7. The method of claim 1, wherein each blendshape node comprises a corresponding weight.

8. The method of claim 1, further comprising determining a directional relationship between the sensor value and the blendshape mapping.

9. The method of claim 1, wherein the facial tracking sensor comprises a resonant radio frequency sensor.

10. A computing system comprising:
    a facial tracking sensor;
    a logic system; and
    a memory system comprising instructions executable by the logic system to
      receive a sensor value acquired via the facial tracking sensor,
      determine an interpolated value within a value range, the value range corresponding to a blendshape range for a facial expression,
      determine a blendshape mapping for each blendshape node of a list of linked blendshape nodes based at least upon the interpolated value,
      determine expression data based at least upon the blendshape mapping, and
      provide the expression data to another computing device.

11. The system of claim 10, wherein the instructions executable to determine the interpolated value comprise instructions executable to center a rolling minimum sensor value to form a rolling centered minimum, and center a rolling maximum sensor value to form a rolling centered maximum.

12. The system of claim 11, wherein the instructions executable to determine the interpolated value comprise instructions executable to determine a rolling centered median sensor value and determine a centered sensor value based at least upon the rolling centered median sensor value, the rolling centered minimum, and the rolling centered maximum, and to interpolate the centered sensor value.

13. The system of claim 12, wherein the instructions are further executable to perform a transform on the interpolated value to form a transformed value, and wherein the instructions executable to determine the blendshape mapping based at least upon the interpolated value comprise determine the blendshape mapping based on the transformed value.

14. The system of claim 10, wherein the instructions are further executable to determine a directional relationship between the sensor value and the blendshape mapping.

15. The system of claim 10, wherein the facial tracking sensor comprises a resonant radio frequency sensor.

16. A method of controlling computer-generated facial expressions, comprising:
   receiving a sensor value acquired via a facial tracking sensor;
   receiving head pose data;
   determining an interpolated value for the sensor value within a value range, the value range corresponding to a blendshape range for a facial expression;
   determining a blendshape mapping for each blendshape node of a list of linked blendshape nodes based at least upon the interpolated value;
   determining expression data based at least upon the blendshape mapping and the head pose data; and
   providing the expression data to a device.

17. The method of claim 16, wherein the facial tracking sensor comprises a resonant radio frequency sensor.

18. The method of claim 16, wherein receiving the head pose data comprises one or more of receiving data from an inertial measurement unit or receiving data from an image sensor.

* * * * *